US011698746B1

(12) United States Patent
Geukens et al.

(10) Patent No.: US 11,698,746 B1
(45) Date of Patent: Jul. 11, 2023

(54) JOURNAL SCHEME FOR A MEMORY SUB-SYSTEM

(71) Applicant: Micron Technology, Inc., Boise, ID (US)

(72) Inventors: Tom V Geukens, Longmont, CO (US); Daniel A Boals, Broomfield, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/683,946

(22) Filed: Mar. 1, 2022

(51) Int. Cl.
*G06F 3/06* (2006.01)
*G06F 12/10* (2016.01)

(52) U.S. Cl.
CPC .......... *G06F 3/0653* (2013.01); *G06F 3/0604* (2013.01); *G06F 3/0685* (2013.01); *G06F 12/10* (2013.01)

(58) Field of Classification Search
CPC ...... G06F 12/10; G06F 3/0604; G06F 3/0653; G06F 3/0685
See application file for complete search history.

(56) References Cited

U.S. PATENT DOCUMENTS 10,776,211 B1 * 9/2020 Natanzon ............ G06F 11/1464
2007/0300033 A1 * 12/2007 Kano .................... G06F 3/0689
711/170

OTHER PUBLICATIONS

T.-Y. Chen et al., "wrJFS: A Write-Reduction Journaling File System for Byte-addressable NVRAM," in IEEE Transactions on Computers, vol. 67, No. 7, pp. 1023-1038, Jul. 1, 2018, doi: 10.1109/TC.2018.2794440. (Year: 2018).*

* cited by examiner

*Primary Examiner* — Khoa D Doan
(74) *Attorney, Agent, or Firm* — Lowenstein Sandler LLP

(57) ABSTRACT

An operation performed on a non-volatile memory device is detected. A type of the operation is determined. The type of the operation comprises a type identifier and a type modifier. A journal entry is generated reflecting the operation. The journal entry comprises a body reflecting the operation and a header comprising the type identifier and the type modifier. A combination of the type identifier and the type modifier define a size of the journal entry. The journal entry is written to a volatile memory device.

20 Claims, 8 Drawing Sheets

210

| No. 212 | Description 214 | Type 216 | Size (bytes) 218 | Journal Entry Format 218 |
|---|---|---|---|---|
| 1 | Host Write Non-Sequential | 0 | 1 + sizeof(LBA) + count * sizeof(LTU) | A |
| 2 | Host Write Sequential | 1 | 1 + sizeof(LBA) + sizeof(LTU) | B |
| 3 | Aborted Host Write | 0xF | 1 + sizeof(LBA) + count * sizeof(LTU) | A |
| 4 | Folding Write | 2 | 1 + sizeof(LBA) + count * sizeof(LTU) | A |
| 5 | Region Deallocate | 3 | 1 + sizeof(LBA) + sizeof(region index) | E |
| 6 | Region Range Deallocate | 3 | 1 + sizeof(region index) + sizeof(deallocate range info) | F |
| 7 | Page Version | 4 | 1 + sizeof(page-version) | G |
| 8 | End of Journal | 4 | 1 + sizeof(page-version) | H |
| 9 | UECC | 5 | 1 + sizeof(LTU) + sizeof(LTU Count) | I |

| No. 212 | Description 214 | Type 216 | Size (bytes) 218 | Journal Entry Format 218 |
|---|---|---|---|---|
| 1 | Host Write Non-Sequential | 0 | 1 + sizeof(LBA) + count * sizeof(LTU) | A |
| 2 | Host Write Sequential | 1 | 1 + sizeof(LBA) + sizeof(LTU) | B |
| 3 | Aborted Host Write | 0xF | 1 + sizeof(LBA) + count * sizeof(LTU) | A |
| 4 | Folding Write | 2 | 1 + sizeof(LBA) + count * sizeof(LTU) | A |
| 5 | Region Deallocate | 3 | 1 + sizeof(LBA) + sizeof(region index) | E |
| 6 | Region Range Deallocate | 3 | 1 + sizeof(region index) + sizeof(deallocate range info) | F |
| 7 | Page Version | 4 | 1 + sizeof(page-version) | G |
| 8 | End of Journal | 4 | 1 + sizeof(page-version) | H |
| 9 | UECC | 5 | 1 + sizeof(LTU) + sizeof(LTU Count) | I |

FIG. 2

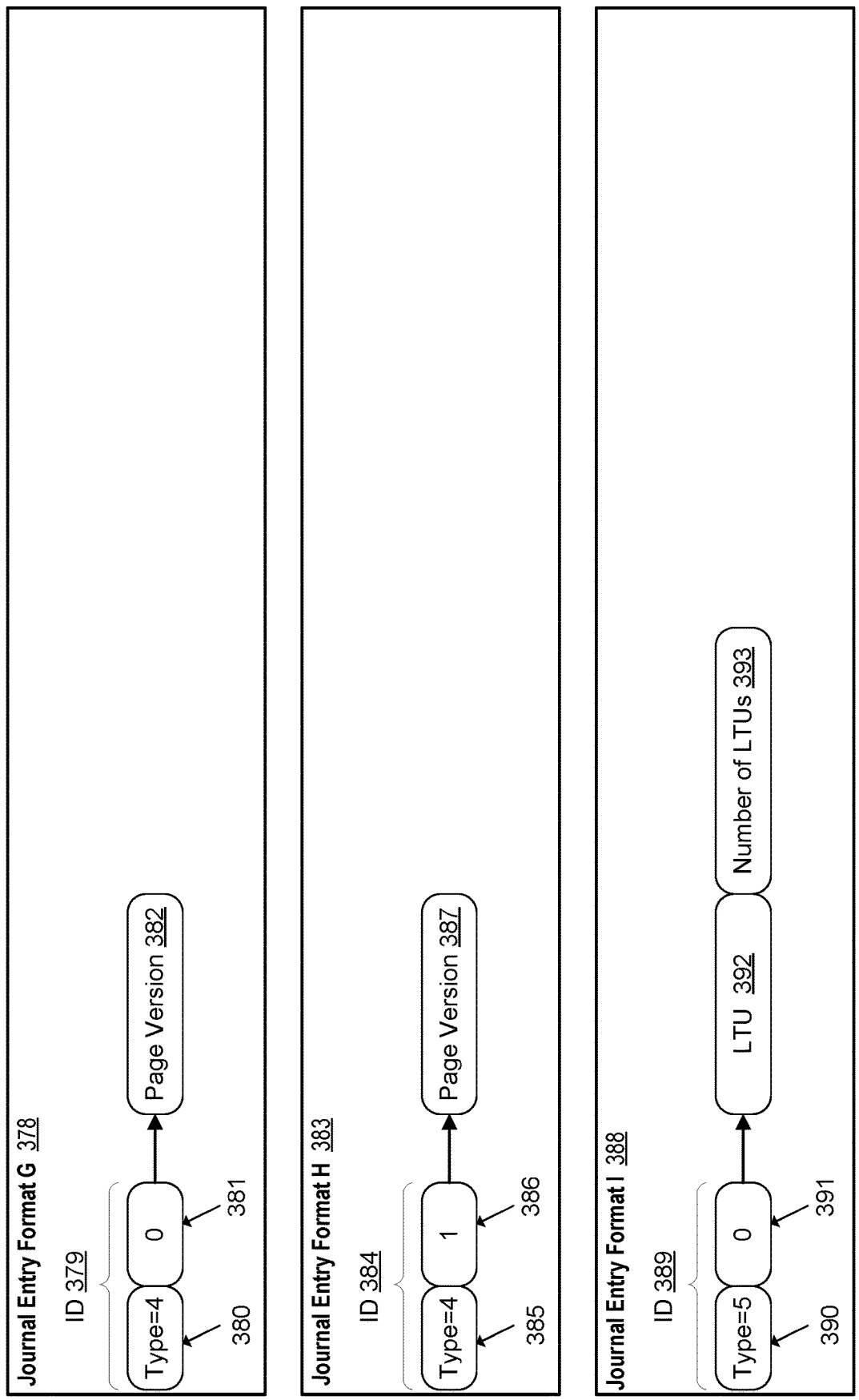

JOURNAL SCHEME FOR A MEMORY SUB-SYSTEM

TECHNICAL FIELD

Embodiments of the disclosure relate generally to memory sub-systems, and more specifically, relate to a journal scheme for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a table describing journal entries for a variety of operations, in accordance with some embodiments of the present disclosure.

FIGS. 3A-3C illustrate examples of journal entry formats used for journal entries, in accordance with some embodiments of the present disclosure.

DETAILED DESCRIPTION

Figure 1:
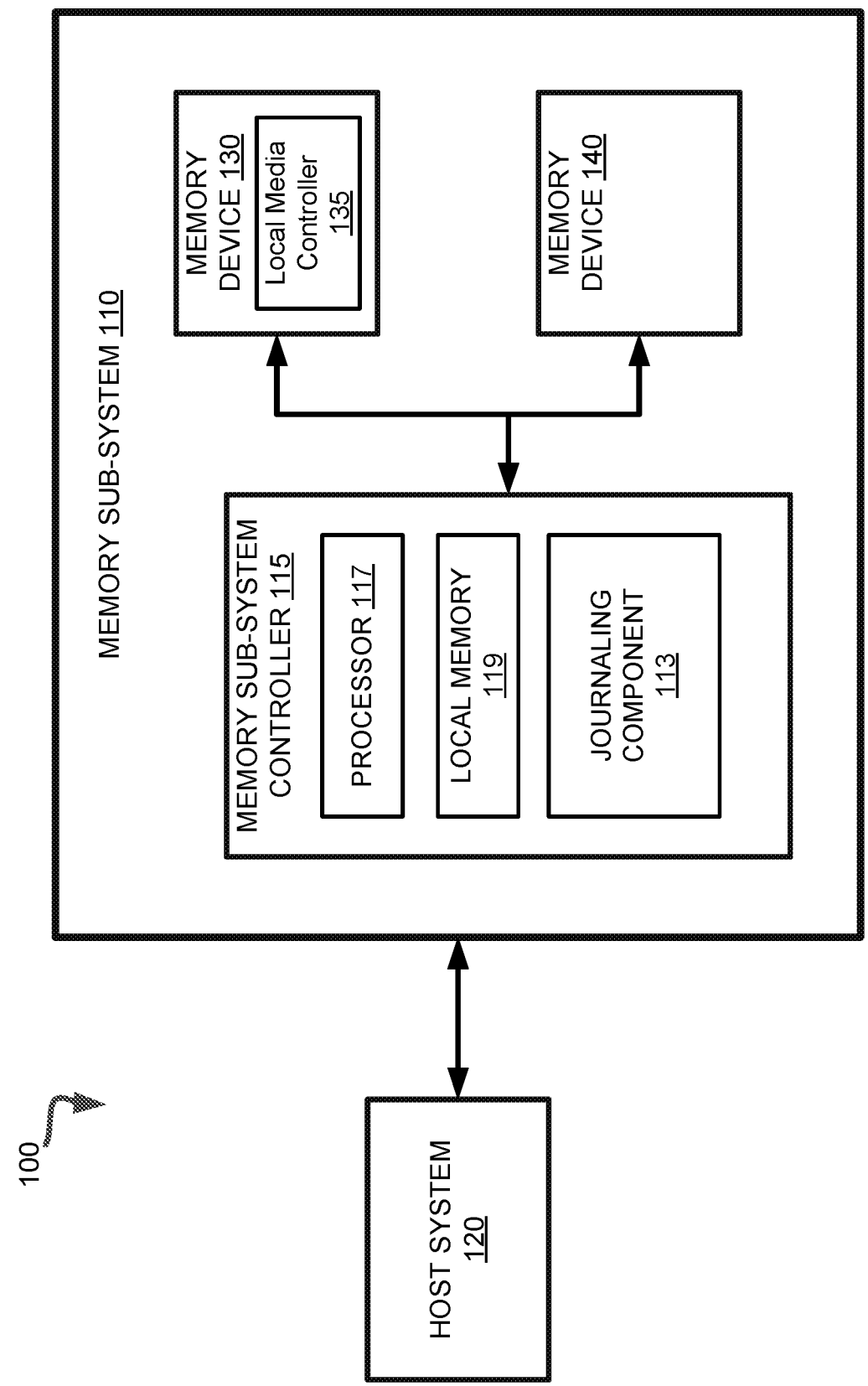
FIG. 1 illustrates an example computing system that includes a memory sub-system in accordance with some embodiments of the present disclosure.

Aspects of the present disclosure are directed to a journal scheme for a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

A memory device can include multiple memory cells arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Data operations can be performed by the memory sub-system. The data operations can include host-initiated operations. For example, the host system can initiate a data operation (e.g., write, read, erase, etc.) on a memory sub-system. The host system can send access requests (e.g., write command, read command) to the memory sub-system, such as to store data in the memory device at the memory sub-system and to read data from the memory device of the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), and the like. Data operations can also be initiated by the memory sub-system controller, such as to perform media management operations. A media management operation can include, for example, a wear leveling operation, a garbage collection operation, or a folding operation.

In order to isolate, from the host system, various aspects of physical implementations of memory devices employed by memory sub-systems, the memory sub-system can maintain a data structure that maps each logical address to a corresponding physical address. In some implementations, the physical address can include channel identifier, die identifier, page identifier, plane identifier and/or frame identifier. This mapping data structure is referred to herein as a logical-to-physical (L2P) data structure. The memory sub-system can also maintain a data structure that maps each physical address to a logical address. This mapping data structure is referred to herein as a physical-to-logical (P2L)

table. The P2L and L2P tables collectively are referred to herein as address mapping data structures.

The address mapping data structures are maintained by the firmware of the memory sub-system controller and are stored on one or more non-volatile memory devices of the memory sub-system. In order to improve the overall efficiency of data transfer between a host system and a memory sub-system, the address mapping data structures can at least partially be cached by one or more volatile memory devices of the memory sub-system. In some memory sub-systems, in order to maintain data integrity, the address mapping data structures stored on one or more volatile memory devices are periodically stored on, or copied to, on a non-volatile memory device. The process of storing the address mapping data structures to a non-volatile memory device can be referred to as a metadata dump. Any mapping updates performed between metadata dumps are not stored on the non-volatile memory device, which can lead to potential data loss in the event of an asynchronous power loss (APL).

APL occurs when a memory device is operational and unexpectedly loses power. Memory devices are designed to handle APL events so that data stored in volatile memory is not lost. Common techniques include taking snapshots of a data structure stored in volatile memory (such as the address mapping data structures), journaling metadata to capture recent changes to the data structure, and flushing journals upon detection of APL so that the data structure can be rebuilt. The concept of journaling is to buffer metadata in a smaller data structure (i.e., a journal) that can be used to rebuild the larger data structure. Flushing is the act of writing data out to non-volatile memory (NVM) to preserve the data upon power loss.

Conventional memory devices handle APL in different ways, seeking to balance different characteristics of APL such as the amount of data to flush to NVM, number of power capacitors to use to retain the volatile memory data, boot and APL repair time, as well as write amplification involved with backing up data (e.g., taking snapshots and flushing data). Some memory devices depend on snapshots of logical-to-physical (L2P) mapping data structures and continuously flushing numerous journals to make sure data is coherent after APL.

In some memory sub-systems, the data is written to the numerous journals via journal entries. Memory sub-systems can generate and transmit a journal entry for each action performed on a memory device. An action can be any modification to an address mapping data structure (such as an L2P data structure). In embodiments, an action can be a host operation detected by the memory sub-system controller, a media management operation performed by the memory sub-system controller, or some other action that is to be journaled (e.g., a region deallocation action, or an end-of-journal indication). Conventional journal entries can have a predetermined static format, which can be verbose. In some memory sub-systems, each journal entry can include the action performed on the memory device, as well as the location of the data on which the action is performed.

Journal entries can store modifications to L2P data structures. Each journal entry can store an indication of the action that modified the data structure, as well as the logical address and the physical address modified by the action. The action can be, for example, a host write operation, or a media management operation. For example, convention journal entries can include the action, the logical translation unit(s) associated with the action (e.g., the location, on the host, of the data modified by the action), and the logical address specified by the action (e.g., a representation of the location, on the memory device, of the data modified by the action). For example, in the case of NAND flash memory, the logical translation unit (LTU) can be a subset of multiple logical block address (LBA) values that can be mapped to a physical address via the address mapping data structures. The logical address specified by the action can indicate where the LTU is stored on the memory device.

Some memory sub-systems generate and store a journal entry for each action that modifies data stored on a memory device. Each journal entry can follow a certain structure (e.g., action, LTU, logical address). The journal entries in conventional memory sub-systems can be uniform in size. As the size of memory sub-systems continues to increase, the size of the journal entries also continues to increase. Consequently, the amount of space required to store journals can be overly cumbersome. For example, a memory sub-system that can store 32 terabytes of data may have LTUs and LBAs that each span 5 bytes. As such, conventional journal entries that follow a specified uniform format (e.g., action, LTU identifier, LBA) can be 11 bytes each (1 byte to store the action, 5 bytes for the LTU identifier, and 5 bytes for the LBA). Storing an 11-byte journal entry for each action performed on a memory device within a memory sub-system can result in an unreasonable amount of space used for journal storage.

Furthermore, generating and storing separate and uniform journal entries for each L2P data structure modification can lead to increased write amplification. To continue the example above, in which each journal entry is about 11 bytes, in a memory device with 16 k pages, conventional memory sub-systems can store 1,500 journal entries per page. Once a page worth of data is written to a journal, it is flushed to non-volatile memory. Using individual and uniform journal entries for each action or modification to an L2P data structure leads to flushing the journal to non-volatile memory more often, thus resulting in increased write amplification. Additionally, the increasing number of journal entries generated for larger memory sub-systems affects the over-provisioning of the memory sub-system. Over-provisioning refers to keeping above one the ratio of the physical capacity of a memory device and the logical capacity presented through the operation system as available to a host system. When journal entries grow in size and in number, the logical capacity may get exceeded before the end of life of the memory device.

Aspects of the present disclosure address the above-noted and other deficiencies by having a memory sub-system that implements a journal scheme that generates and stores compact journal entries of various sizes. The memory sub-system controller can detect actions that modify data stored a memory device. For example, the memory sub-system controller can detect host data access operations, media management operations, and/or modifications made to an address mapping data structure (e.g., an L2P data structure). The memory sub-system controller can determine the type of the detected action, and can generate a journal entry reflecting the action. For example, the memory sub-system controller can detect an action that has a type of a sequential host write operation. Based on predefined journal entry formats, the memory sub-system controller can generate a journal entry unique to sequential host write operations. For example, the sequential host write operation can modify data stored at a logical address on the memory device, and the sequential host write operation can specify the logical translation units (LTUs) modified by the operation. Because the host write operation is a sequential host write operation, the LTUs modified are in sequential order. Thus, the journal entry reflecting the sequential host write operation can include the logical address modified by the write operation, as well as the first LTU identifier in the sequential range. Storing each LTU identifier in the sequential range in the journal entry may result in unnecessarily storing redundant information, because the memory sub-system controller can determine the LTUs in the sequential range based on the first LTU and the action type identifier.

Each type of action can have a corresponding journal entry format. The journal entry formats can be unique to each type of action, and can avoid storing redundant information. That is, the memory sub-system controller can use the data from each unique journal entry to determine any additional information that may be needed to replay the journal (e.g., to reconstruct the L2P data structure). Using a host write operation as an example, rather than generating and storing a journal entry for each logical address and logical translation unit identifier modified by the host write, the journal scheme described herein generates and stores a single journal entry that includes the base logical address as well as identifiers of the logical translation units modified by the host write operation. As another example, a journal entry can store a page version action, or an end of journal action. Rather than store a uniform-sized journal entry to store an end of journal tag, for example, the journal scheme described herein enables the memory sub-system controller to generate and store a smaller journal entry to store the end of journal tag.

In embodiments, the memory sub-system controller can generate a journal entry. The journal entry can include a header and a body. The header can include an identifier of the type of the journal entry (e.g., the type of the action that modifies data stored on the memory device, or that modifies an L2P table), and a modifier that further defines the type. In some embodiments, the modifier can be a count that specifies the number of LTUs modified by the action, for example. In some embodiments, the modifier can distinguish between two actions that share a type value. That is, two or more journaled actions can share a journal entry type, and the modifier further defines the journal entry type. For example, a page-version action and an end-of-journal tag can both have type "4;" the page-version action modifier can be "0" and the end-of-journal tag modifier can be "1." Thus, the memory sub-system controller can determine the action of the journal entry based on the combination of the type and the modifier stored in the header of the journal entry.

The body of the journal entry can include the information that the memory sub-system controller can use to rebuild the L2P data structure. For example, for a host write operation, the body of the journal entry can include the base logical address of the data modified by the journaled action, and identifiers of the LTUs modified by the action. As another example, for a region range deallocation journal entry, the body of the journal entry can include the region index and the deallocation command information. The memory sub-system controller can use the information stored in the body of the journal entry to reconstruct the L2P data structure in the event of an APL, for example. Upon an APL, the memory sub-system controller can flush the journal from volatile memory to non-volatile memory. Upon a power-on event following an APL, the memory sub-system controller can replay the journal that were flushed to non-volatile memory to reconstruct the L2P data structure. The memory sub-system controller can replay the journal by iterating through the journal entries and implementing the modifications based on the information stored in the body of each journal entry.

Using the information in the header, the memory sub-system controller can determine the size of the journal entry. That is, based on the type value and the modifier value stored in the header of a journal entry, the memory sub-system controller can determine size of the journal entry. For each journal entry type value, the memory sub-system controller can include an associated size definition. Additionally, the memory sub-system controller can determine the location (i.e., the byte position) of the next journal entry based on the determined size of the previous journal entry.

Advantages of the present disclosure include, but are not limited to, increased performance of the memory sub-system and an increase in the quality of service (QoS) of the memory sub-system. Aspects of the present disclosure enable for journal entries that vary in size and that store non-redundant information, thus allowing for smaller journal entries. As the sizes of the journal entries are reduced, more journal entries can be stored on a page, thus reducing write amplification as well as over provisioning. That is, by storing more journal entries per page, the memory sub-system reduces the amount of memory reserved for over-provisioning. Furthermore, the memory sub-system controller can flush the journal once the journal size has reached a page worth of data. By reducing the sizes of the journal entries, and thus storing more journal entries on a page, the journal is flushes less frequently and write amplification is reduced. Additionally, by having fewer writes to the journal, and fewer journal flushes, the host operations are interrupted less frequently, thus increasing the overall QoS.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a journaling component 113 that can generate and store journal entries of various sizes to efficiently create a compact journal. In some embodiments, the memory sub-system controller 115 includes at least a portion of the journaling component 113. In some embodiments, the journaling component 113 is part of the host system 110, an application, or an operating system. In other embodiments, local media controller 135 includes at least a portion of journaling component 113 and is configured to perform the functionality described herein.

The journaling component 113 can detect an action that modifies data stored on the memory devices (e.g., memory devices 130, 140) within the memory sub-system 110. The action can be a host operation, such as a write operation received from the host system 120. The action can be a media management operation, such as a folding write operation, or a region deallocation operation. In some embodiments, the journaling component 113 can detect a modification made to an address mapping data structure (e.g., an L2P data structure). The journaling component 113 can generate a journal entry for the detected action and/or modification. In embodiments, the journaling component 113 can generate and store journal entries for events not associated with a detected operation. For example, journaling component 113 can generate and store journal entries for undetected error events (UECC), to signal the end of the journal, or to indicate a page version.

The journaling component 113 can generate a journal entry based on the type associated with the journal entry. The journaling component 113 can then store the journal entry in one or more journals. The journal can be stored initially in volatile memory (e.g., on memory device 140). The journaling component 113 can flush the journal from volatile memory to non-volatile memory (e.g., memory device 130). The journaling component 113 can flush the journal to non-volatile memory at predetermined time intervals (e.g., every hour), and/or can flush the journal to non-volatile memory once a predetermined amount of data has been written to the journal. For example, once a page worth's of data has been written to the journal, the journaling component 113 can flush the journal to non-volatile memory. Flushing the data structure to non-volatile memory can include storing the journal entries in a journal on a non-volatile memory device (e.g., memory device 130) and deleting the flushed journal entries from the journal on volatile memory (e.g., memory device 140). In embodiments, the journaling component 113 can generate a packet to store and transmit the journal entry.

In embodiments, the journal entry can include a header and a body. The header of the journal entry can include an identifier of the type associated with the journal entry (e.g., indicating the type of action), and a count or a modifier associated with the type. The body of the journal entry can be unique to the type of the journal entry. The journaling component 113 can determine the length or size of the journal entry based on the type identifier combined with the count or modifier. Using unique journal entry formats for the various types of journal entries, the journaling component 113 can generate a compact journal that stores non-redundant information. The types of journal entries and associated journal entry formats are further described with respect to FIGS. 2, 3A-3C.

In embodiments, upon an asynchronous power loss, the memory sub-system 110 can transfer the journal entries stored on volatile memory to non-volatile memory. Upon a power-on event following an asynchronous power loss event, the journaling component 113 can replay the journal stored on non-volatile memory (e.g., memory device 130) to restore the address mapping data structures (e.g., an L2P data structure). In embodiments, the journaling component 113 can identify the journal entry (or entries) that stores a modification to an L2P data structure that has not yet been implemented in the L2P data structure. For example, the journal can include an indicator that indicates the last journal entry to have been implemented in the L2P data structure. The journaling component 113 can identify the first journal entry in the journal that has not been implemented in the L2P data structure, and can replay the journal starting with the identified first journal entry in order to rebuild the L2P data structure.

In embodiments, the journaling component 113 can use a switch case statement to replay the journal entries. For example, based on the value of the type stored in the header of the journal entry, the journaling component 113 implement an encoded scheme to read the journal entry and implement the journaled action included in the body of the journal entry in the L2P data structure. In some embodiments, the journaling component 113 can use a lookup table to replay the journal entries. For example, the journaling component 113 can determine the type of the action in the journal entry by looking up the type value in a data structure (e.g., table 210 of FIG. 2), and can implement the journaled action in the L2P data structure accordingly.

Further details with regards to the operations of the journaling component 113 are described below.

Figure 3A:
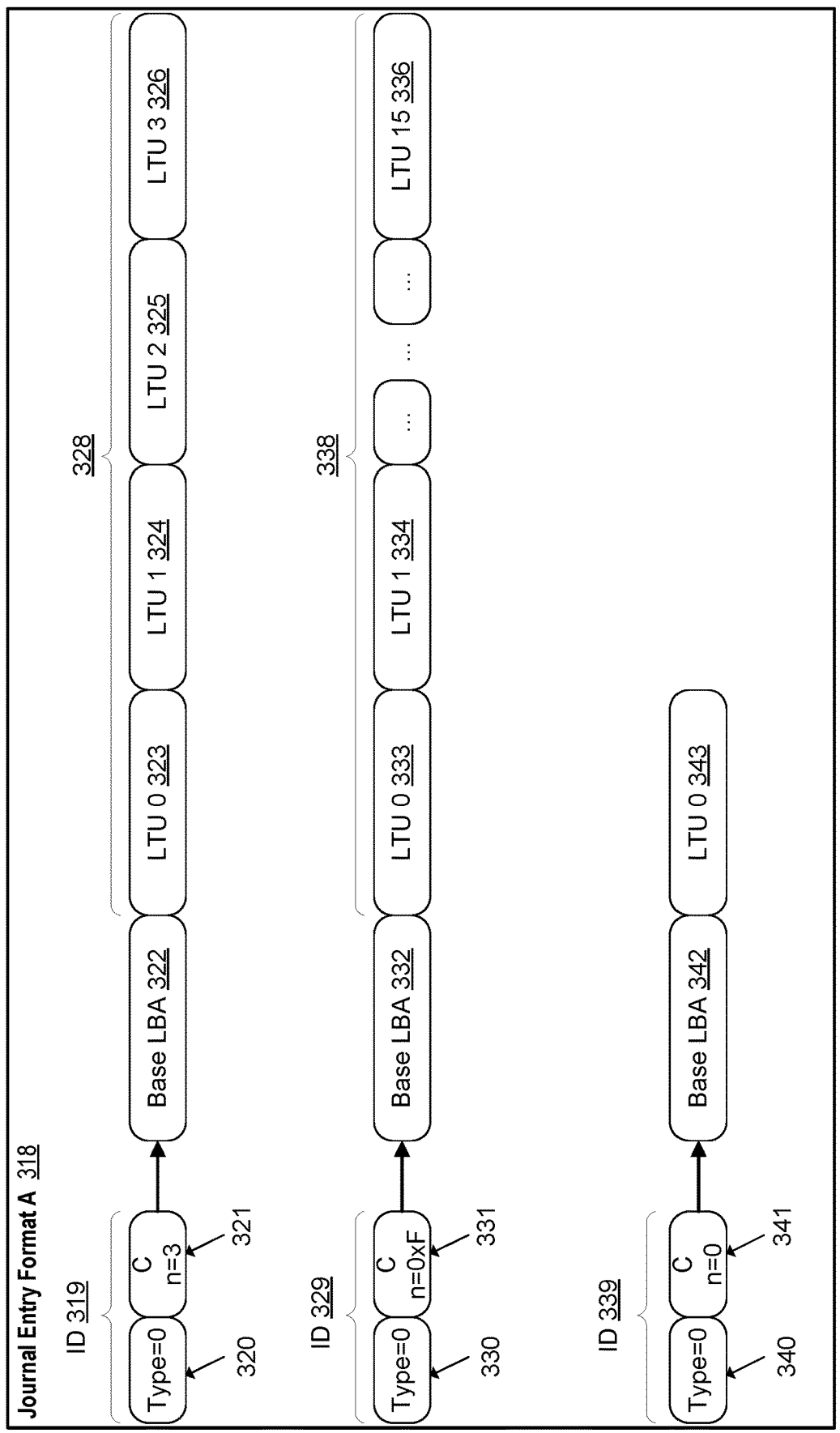
Figure 3B:
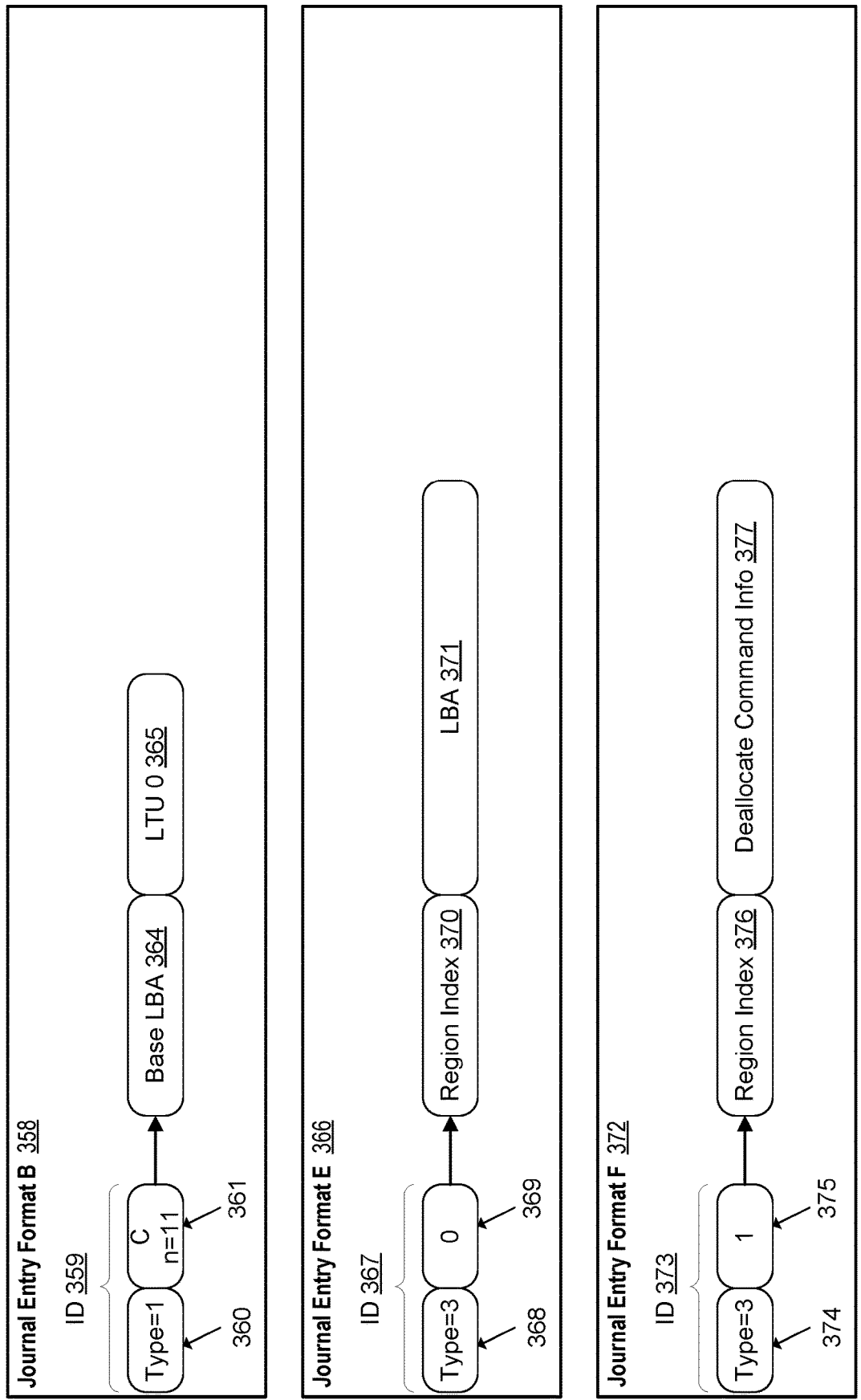

FIG. 2 is a table 210 describing journal entries for a variety of operations, in accordance with some embodiments of the present disclosure. FIGS. 3A-3C illustrate examples of journal entry formats A-I (318, 358, 366, 372, 378, 383, 388) used to generate journal entries, in accordance with some embodiments of the present disclosure.

In embodiments, the journaling component 113 of FIG. 1 can generate a variety of types of journal entries to store in a journal. FIG. 2 lists nine examples of journal entries, with 5 different types of journal entries. It should be noted that journaling component 113 can generate and store more or fewer types of journal entries than those listed in FIG. 2. Table 210 includes five columns, 212-218. Column 212 lists the row number, column 214 lists the description of the type of operation to be stored in a journal, column 216 lists the types of journal entries, column 218 describes the size of the journal entries, and column 218 lists the journal entry format of the journal entries. As illustrated in FIG. 2, the size (218) of the journal entry varies based on the journal entry type. The journal entry formats 218 are further described with respect to FIGS. 3A-3C.

The first journal entry (No. 1 in column 212) described in table 210 is for non-sequential (or random) host writes. The type 216 value for a non-sequential host write journal entry is "0." The size 218 of the journal entry for non-sequential host writes can be determined based on the size of the base LBA associated with the host write, the size of the LTU identifiers modified by the action along with the number of LTUs modified by the action, plus the size of the journal entry header (e.g., one byte for the journal entry header). Journal entry format A, associated with non-sequential host write operations, is further described with respect to FIG. 3A.

Referring to FIG. 3A, journal entry format A 318 includes three example journal entries associated with non-sequential host write operations. The first example journal entry illustrates a header ID 319 that includes a type indicator 320 (e.g., type value "0") and a count 321. The type indicator 320 and the count 321 can each be a half a byte in size. The count 321 indicates the number of LTUs modified by the journaled action. The count 321 can be zero-based (i.e., the value stored in field 321 is the actual count decremented by 1). Hence in this example, a count of 3 indicates that 4 LTUs are modified by the action. Based on the header ID 319, the journaling component 113 of FIG. 1 can determine the size of the journal entry. As indicated in the size column 218 of table 210 of FIG. 2, the size of journal entry A can be determined by multiplying the size of the LTU identifier by the number of LTUs denoted in the header (e.g., in this example, the size of the LTU identifier multiplied by 4), added to the size of the base LBA 322, plus one byte for the header. The base LBA indicates the first logical block address, on the memory device, modified by the action. In embodiments, (e.g., for NAND Flash devices), the base LBA can include a flash logical address (FLA). The FLA can represent the location of the data modified by the action on the memory device. Because LBAs can be written to in sequential order, the journal entry can include the base LBA (i.e., the first LBA in the sequence) and the journaling component 113 can determine the subsequent LBAs by incrementing starting from the base LBA. The body of the journal entry includes a base LBA 322, and the LTU identifiers 328 modified by the action. The LTU identifiers 328 can identify the logical addresses, associated with the host, of the data modified by the action. In this example, the LTUs modified by the action are identified by LTU 0 323, LTU 1 324, LTU 2 325, and LTU 3 326.

This example illustrates the space savings resulting from the journaling scheme described herein. Compared to some other journaling schemes in which each LTU modification would generate a separate journal entry of a predetermined uniform size, the journaling scheme described herein results in using significantly less space. Specifically in this example, a conventional journaling scheme would generate and store at least four journal entries, each one including the action, the logical address, and associated the LTU (e.g., the first journal entry would include an action type, the base LBA 322, and LTU 0 identifier 323; the second journal entry would include the action type, the base LBA 322, and LTU 1 identifier 324; etc.). The journaling scheme described herein generates and stores a single journal entry that can be used to derive the same information as is stored in the four journal entries using the conventional journaling scheme. To illustrate the space savings, if the LBA is 5 bytes and the LTU identifier is 5 bytes, the four journal entries in some other journaling scheme would amount to up to 44 bytes of data (each entry would include 1 byte for the action type, 5 bytes for the LBA and 5 bytes for the LTU identifier). Using the journaling scheme described herein, the single journal entry to cover the same modifying action would be 26 bytes (the size of the header+sizeof(LBA)+count*sizeof(LTU identifier)=1+5+4*5).

The second example of journal entry format A 318 is for a non-sequential host write that includes 16 LTUs. The header 329 includes a type indicator 330 (e.g., type value "0"), and a count value 331 (e.g., count value "0xF" to indicate 16 LTUs). The body of the journal entry can include the base LBA 332, and the 16 LTU identifiers 338 modified by the action. Similar to the example above, the size of the journal entry can be determined from the information stored in the header of the journal entry. The size of journal entry A can be determined by multiple the size of the LTU identifier by the number of LTU identifiers denoted in the header (e.g., in this example, the size of the LTU identifier multiplied by 16), added to the size of the base LBA 332, plus the size of the header (e.g., one byte). As mentioned above, a conventional journaling scheme in which each LTU modification would generate a separate journal entry of a predetermined uniform size would use up to 176 bytes to store 16 journal entries (each journal entry includes the action (1 byte), plus the size of the LTA (5 bytes) plus the size of the LTU identifier (5 bytes)). The size of the single journal entry described in this example would be 86 bytes (size of header+sizeof(LBA)+count*sizeof(LTU identifier) =1+5+16*5). Not only does the journaling scheme described herein generate a more compact journal using less storage space, fewer journal entries are written to the journal, thus resulting in fewer operations that may interfere with host traffic and reducing write amplification.

The third example of journal entry format A 318 is for a non-sequential host write that includes one LTU. The header 339 includes a type indicator 340 (e.g., type value "0"), and a count value 341 (e.g., count value of "0" to indicate a single LTU). The body of the journal entry includes the base LBA 342 and the LTU 0 identifier 343. The size of this journal entry is the size of the header (e.g., 1 byte)+the size of the base LBA 342+the size of the LTU 0 identifier 343.

In embodiments, journal entry format A 318 can also be used for aborted host writes (listed in table 210 of FIG. 2 as No. 212 3) and/or folding write operations (listed in table 210 of FIG. 2 as No. 212 4). For an aborted host write operation, the type can have a value of "0xF." For a folding write operation, the type can have a value of "2." The journal entry format 318 of an aborted host write operation and/or a folding write operation are similar to those described above with respect to FIG. 3A.

FIG. 3B describes journal entry format B (358), journal entry format E (366), and journal entry format F (372). Journal entry format B (358) includes an example journal entry to store sequential host write operations. The example includes a header ID 359, which includes a type indicator 360 and a count 361. In embodiments, the size of the header ID 319 can be one byte, with the type indicator 360 being a half a byte and the count 361 being a half a byte. In this example, the type is "1," and the count is "11," denoting that the host write operation is for 12 LTUs. The body of the journal entry includes the base LBA 364, and the first LTU identifier 365 in the sequential range. Using this information, following an APL, the journaling component 113 of FIG. 1 can rebuild the L2P data structure to include the modifications made by the sequential host write operations. Because the journaling component 113 can determine that a journal entry format of type "1" is for a sequential host write operation, the journaling component 113 can use the count value to update the L2P data structure for all 12 LTUs in the sequence, beginning with the first LTU in the sequence, indicated as LTU 0 identifier 365 in the body of the journal entry.

The size of a journal entry format B journal entry, as described in the size column 218 of table 210 of FIG. 2, can be determined by adding the size of the header (e.g., 1 byte) to the size of the LBA 364 and the size of the LTU identifier 365. Compared to conventional journaling schemes in which each LTU modification would generate a separate journal entry of a predetermined uniform size, the journaling scheme described herein results in using significantly less space. Specifically in this example, a conventional journaling scheme would generate and store at least 12 journal entries, each one including the action (host write), the logical address, and associated the LTU. The journaling scheme described herein generates and stores a single journal entry that can be used to derive the same information as is stored in the 12 journal entries using the conventional journaling scheme. As an example, if the LBA is 5 bytes and the LTU identifier is 5 bytes, the 12 journal entries in the conventional journaling scheme would amount to up to 132 bytes of data (12 entries at 11 bytes each), whereas in the journaling scheme described herein, the single journal entry containing the same information would be 11 bytes (1+sizeof(LBA)+sizeof(LTU identifier)=1+5+5).

Journal entry format E (366) includes an example journal entry associated with a region deallocation. The journal entry format E (366) can include a header ID 367, that includes a type indicator 368 (e.g., type value of "3") and a modifier indicator 369 (e.g., modifier value "0"). The body of the journal entry can specify the region index 370 and the LBA 371. The size of the journal entry format E 366, as described in the size column 218 of table 210 of FIG. 2, can be determined by adding the size of the header (e.g., 1 byte) to the size of the region index 370 and the size of the LBA 371.

Journal entry format F (372) includes an example journal entry associated with a region range deallocation. The journal entry format F 372 can be of the same type as journal entry format E 366 but with a different modifier value 375. That is, journal entry format F (372) can include a header ID 373, that includes a type indicator 374 (e.g., type value of "3") and a modifier indicator 375 (e.g., modifier value "1"). The body of the journal entry can specify the region index 376 and the deallocate command info 377. The size of the journal entry format F 372, as described in the size column 218 of table 210 of FIG. 2, can be determined by adding the size of the header (e.g., 1 byte) to the size of the region index 376 and the size of the deallocation range information 377.

FIG. 3C describes journal entry format G (378), journal entry format H (383), and journal entry format I (388). Journal entry format G (378) includes an example journal entry associated with a page version. The page version can be used to distinguish age of data written to the corresponding page, for example. The memory sub-system controller can record the page version number of the L2P, for example, to determine whether it is safe to dump metadata stored on a page. The journaling component 113 can use journal entry format G 378 to denote a change in the version of the page written. Journal entry format G 378 includes a header ID 379 that includes a type 380 (e.g., type value "4"), and a modifier 381 (e.g., modifier value "0"). The body of the page version entry can include the page version 382. The size of the page version entry, as described in the size column 218 of table 210 of FIG. 2, can be determined by adding the size of the header (e.g., 1 byte) to the size of the page version.

Journal entry format H (383) includes an example journal entry associated with an "End of Journal" tag. The journaling component 113 can generate and store a journal entry to denote the end of the journal. The journaling component 113 can use journal entry format H 383 to generate and store the journal entry. Journal entry format H 383 includes a header ID 384 that includes a type 385 (e.g., type value "4"), and a modifier 386 (e.g., modifier value "1"). The body of the end-of-journal entry can include a page version 387. The size of the end-of-journal entry, as described in the size column 218 of table 210 of FIG. 2, can be determined by adding the size of the header (e.g., 1 byte) to the size of the page version. In an example, the size of the page version can be 5 bytes, and hence the size of journal entry format 318 can be 6 bytes. Compared to conventional journaling schemes that had uniform journal entries, the page version and/or end-of-journal tag journal entry in conventional journaling schemes would be the same as a journal entry for a host write operation. Using the journaling scheme described herein, the journal entry for the page version and/or end-of-journal tag journal entry can be considerably smaller than the journal entries used for other operations, thus resulting in a smaller, more compact journal.

Journal entry format I (388) includes an example journal entry associated with an uncorrectable error events (UECC). The journaling component 113 can use journal entry format I 388 to generate and store a journal entry for uncorrectable error events. The journal entry format I 388 can include a header ID 389 that includes a type indicator 390 (e.g., type value of "5"), and a modifier 391 (e.g., modifier value of "0"). The body of the journal entry can include the LTU identifier 392 associated with the UECC 392, as well as the number of LTUs associated with the UECC 393.

Referring to FIG. 2, the journal entry formats 218 can be encoded in the journaling component 113. Thus, the journaling component 113 can determine the type of the action detected (e.g., the type of operation modifying an L2P data structure), and can generate the journal entry using the predetermined journal entry formats. In embodiments, the journaling component 113 can determine the location at which to store the journal entry based on the size of the previous journal entry, as determined from the information included in the header of the journal entry. Following an asynchronous power loss, the journaling component 113 can reconstruct the L2P data structure using the journal entries. For example, the journaling component 113 can read the first journal entry in the journal and determine the type based on the header of the journal entry. The journaling component 113 can then apply the action type based on the body of the journal entry. The journaling component 113 can determine the location of the second journal entry based on the size of the first journal entry, as determined by the information included in the header of the first journal entry.

For example, the header of first journal entry in the journal may include a type value of "2." The journaling component 113 can determine that type "2" is a folding write operation. In embodiments, the journaling component 113 can use a switch case statement based on the type value to determine the flow of the journal replay. In embodiments, the journaling component 113 can use a data structure (e.g., table 210 of FIG. 2) to determine the action type associated with the journal entry. The journaling component 113 determine the number of LTUs associated with the folding write operation based on the header counter value in the header (e.g., a value of "3"). The journaling component 113 can then read the body of the journal entry to determine the location of the folding write operation, and can rebuild the L2P data structure according to the information stored in the body of the journal entry. The journaling component 113 can determine the location of the second journal in the journal based on the size of the first journal entry. In this example, the size of the first journal entry is the size of the header (e.g., 1 byte) added to the size of the LBA, added to the count of LTUs times the size of the LTU identifier. If the size of the LBA is 5 bytes, and the size of the LTU identifier is 5 bytes, the size of the first journal entry can be 21 bytes (1+5+5*3). Hence, the journaling component 113 can determine that the location of the second journal entry in the journal can be 21 bytes after the location of the first journal entry.

Figure 4:
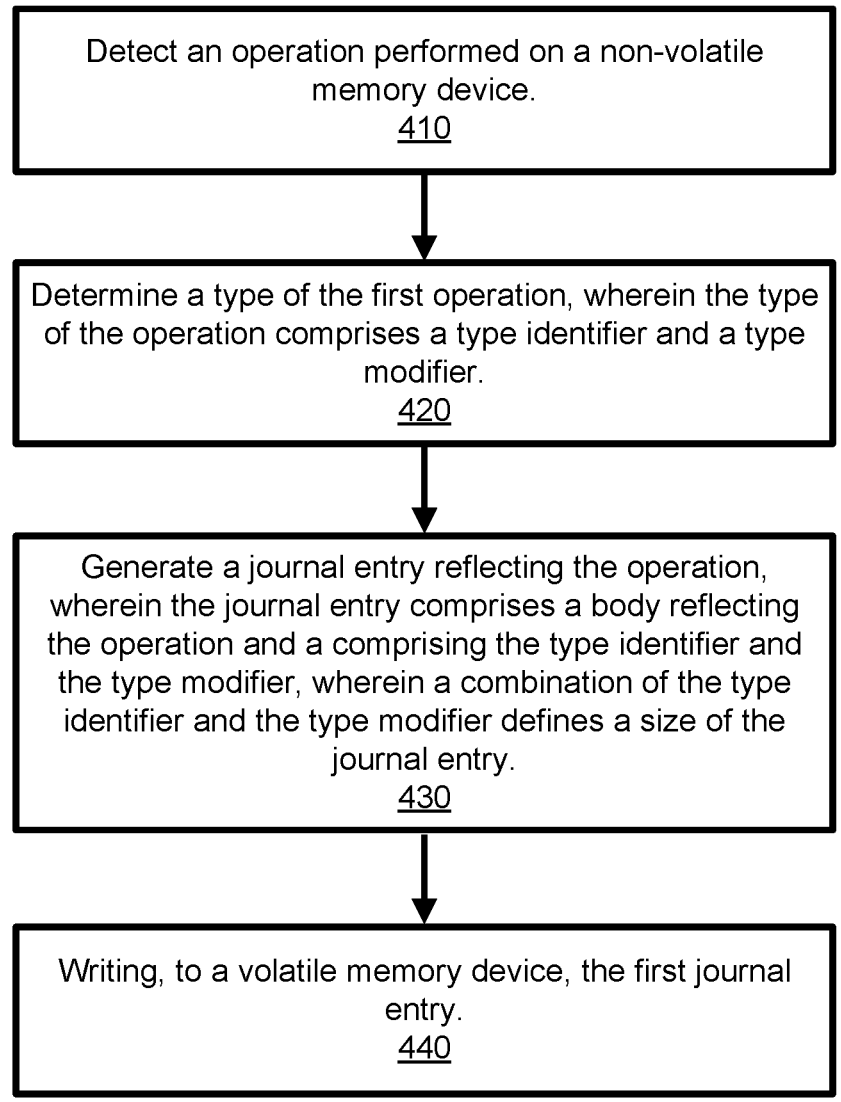
FIG. 4 is a flow diagram of an example method to generate and store journal entries, in accordance with some embodiments of the present disclosure.

FIG. 4 is a flow diagram of an example method 400 to generate and store journal entries, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the journaling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic detects an operation performed on a non-volatile memory device. The operation can be a host operation (e.g., an input/output (TO) operation received from the host) or a media management operation, for example. The processing logic can monitor the plurality of memory devices to detect when an operation is being performed on one of the memory devices.

At operation 420, the processing logic determines a type of the operation. The types of operation can include, for example, a non-sequential host write, a sequential host write, an aborted host write, a folding write operation, a region deallocation, a region range deallocation, a page version update, an end-of-journal tag, and/or an uncorrectable error event (UECC). It should be noted that the list of operation types is not limiting, and the processing logic can determine additional operation types. The type can include a type identifier and a type modifier. The type identifier value can identify the type of the operation, and the type modifier value can be a count associated with the type. For example, for host write operations, the modifier value can represent the number of blocks (or translation units) modified by the write operation. In embodiments, the modifier can further define the type of the operation. For example, a type value of "3" combined with a modifier value of "1" can indicate a region range deallocation command, whereas a type value of "3" combined with a modifier value of "0" can indicate a region deallocation operation.

At operation 430, the processing logic generates a journal entry reflecting the operation. The journal entry includes a body reflecting the operation and a header that includes the type identifier and the type modifier. The combination of the type identifier and the type modifier defines the size of the journal entry.

In embodiments, the body of the journal can include at least one of the following: a logical address associated with the first operation, an indication of a translation unit associated with the first operation, a list of translation units associated with the first operation, a region index, a page version, or command information associated with the first operation. In some embodiments, the second indicator included in the header is a count value, indicating the number of translation units modified by the detected action.

At operation 440, the processing logic writes, to a volatile memory device, the journal entry. The processing logic can maintain a journal on the volatile memory device, and can maintain an indicator identifying the last entry in the journal. The processing logic can add the journal entry to the journal after the last entry in the journal, and the processing logic can update the indicator accordingly. In embodiments, responsive to an asynchronous power loss event, the processing logic flushes the journal entry (or entries) to a non-volatile memory device. In some embodiments, the processing logic flushes the journal entry (or entries) to the non-volatile memory device at predetermined time intervals, or when the journal reaches a predetermined size. For example, the processing logic can flush the journal entries once the size of the entries reach a page on a NAND device. As another example, the processing logic can flush the journal entries every hour.

In embodiments, the processing logic detects a second operation performed on the non-volatile memory device. The processing logic determines a second type of the second operation, and generates a second journal entry reflecting the second operation. The processing logic determines a location in the journal based on the size of the first journal entry. That is, the processing logic can determine where to write the second journal entry based on the size of the first journal entry. The processing logic writes, to the volatile memory device, the second journal entry in the journal at the determined location.

In embodiments, responsive to a power on event following an asynchronous power loss, the processing logic identifies one or more journal entries stored on the non-volatile memory device. The processing logic identifies the first journal entry of the one or more journal entries. The first journal entry includes a header and a body. Based on the header, the processing logic determines the size of the first journal entry. The processing logic determines a location in the non-volatile memory device (e.g., the byte position) of the second journal entry based on the size of the first journal entry. The processing logic can then update the L2P data structure based on the body of the one or more journal entries.

Figure 5:
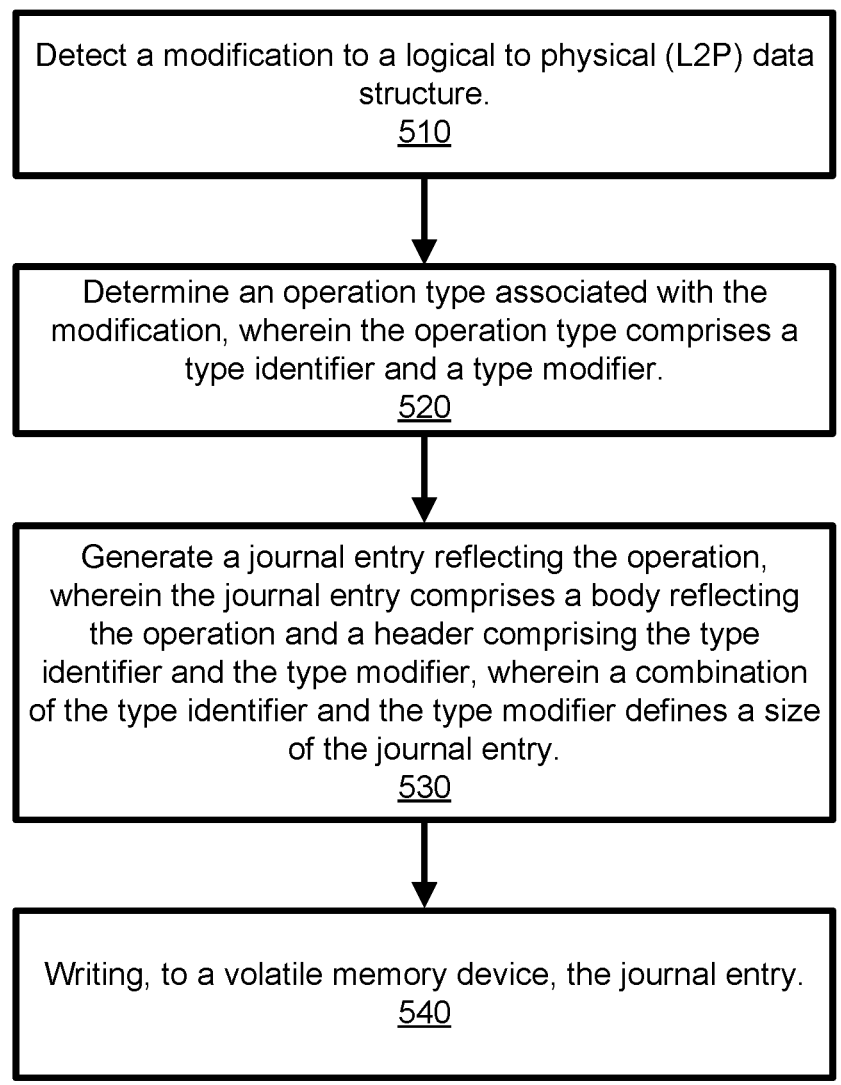
FIG. 5 is a flow diagram of another example method to generate and store journal entries for modifications to a logical to physical (L2P) data structure, in accordance with some embodiments of the present disclosure.

FIG. 5 is a flow diagram of an example method 500 to generate and store journal entries for modifications to a L2P data structure, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the journaling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic detects a modification to a logical to physical (L2P) data structure. At operation 520, the processing logic determines an operation type associated with the modification. The types of operation can include, for example, a non-sequential host write, a sequential host write, an aborted host write, a folding write operation, a region deallocation, a region range deallocation, a page version update, an end-of-journal tag, and/or an uncorrectable error event (UECC). It should be noted that the list of operation types is not limiting, and the processing logic can determine additional operation types. The operation type can include a type identifier and a type modifier. The type identifier value can identify the type of the operation, and the type modifier value can be a count associated with the type. For example, for host write operations, the modifier value can represent the number of blocks (or translation units) modified by the write operation. In embodiments, the modifier can further define the type of the operation. For example, a type value of "3" combined with a modifier value of "1" can indicate a region range deallocation command, whereas a type value of "3" combined with a modifier value of "0" can indicate a region deallocation operation.

At operation 530, the processing logic generates a journal entry reflecting the operation. The journal entry can include a body reflecting the modification and a header comprising the type identifier and the type modifier. The combination of the type modifier and the type identifier defines the size of the journal entry.

In embodiments, the body can include at least one of the following: a logical address associated with the first modification, an indication of a translation unit associated with the first modification, a list of translation units associated with the first modification, a region index, a page version, or command information associated with the first modification.

At operation 540, the processing logic writes, to a volatile memory device, the first journal entry. In embodiments, the processing logic can detect a second modification to the L2P data structure. The processing logic can determine a second operation type associated with the second modification, and can generate a second journal entry reflecting the second operation. The processing logic can determine a location (e.g., a byte position) in a journal at which to write the second journal entry based on the size header of the first journal entry. That is, the processing logic can use the information in the header (the type indicator combined with the type modifier) to determine the size of the journal entry, and can determine the position at which to write the second journal entry as starting immediately after the size of the first journal entry. The processing logic can then write, to the volatile memory device, the second journal entry in the journal at the determined location.

In embodiments, responsive to a power on event following an asynchronous power loss, the processing logic identifies one or more journal entries (e.g., stored on the non-volatile memory device). The processing logic identifies a first journal entry of the one or more journal entries. The first journal can include a header and a body. The processing logic determines, based on the header of the first journal entry, the size of the journal entry. Then, based on the size of the first journal entry, the processing logic can determine a location (e.g., the byte position) of the second journal entry in the journal. The processing logic can update the L2P data structure based on the bodies of the one or more journal entries. That is, the processing logic can determine the modification to the L2P data structure based on the body of the journal entry, and can implement the modification to the L2P data structure.

Figure 6:
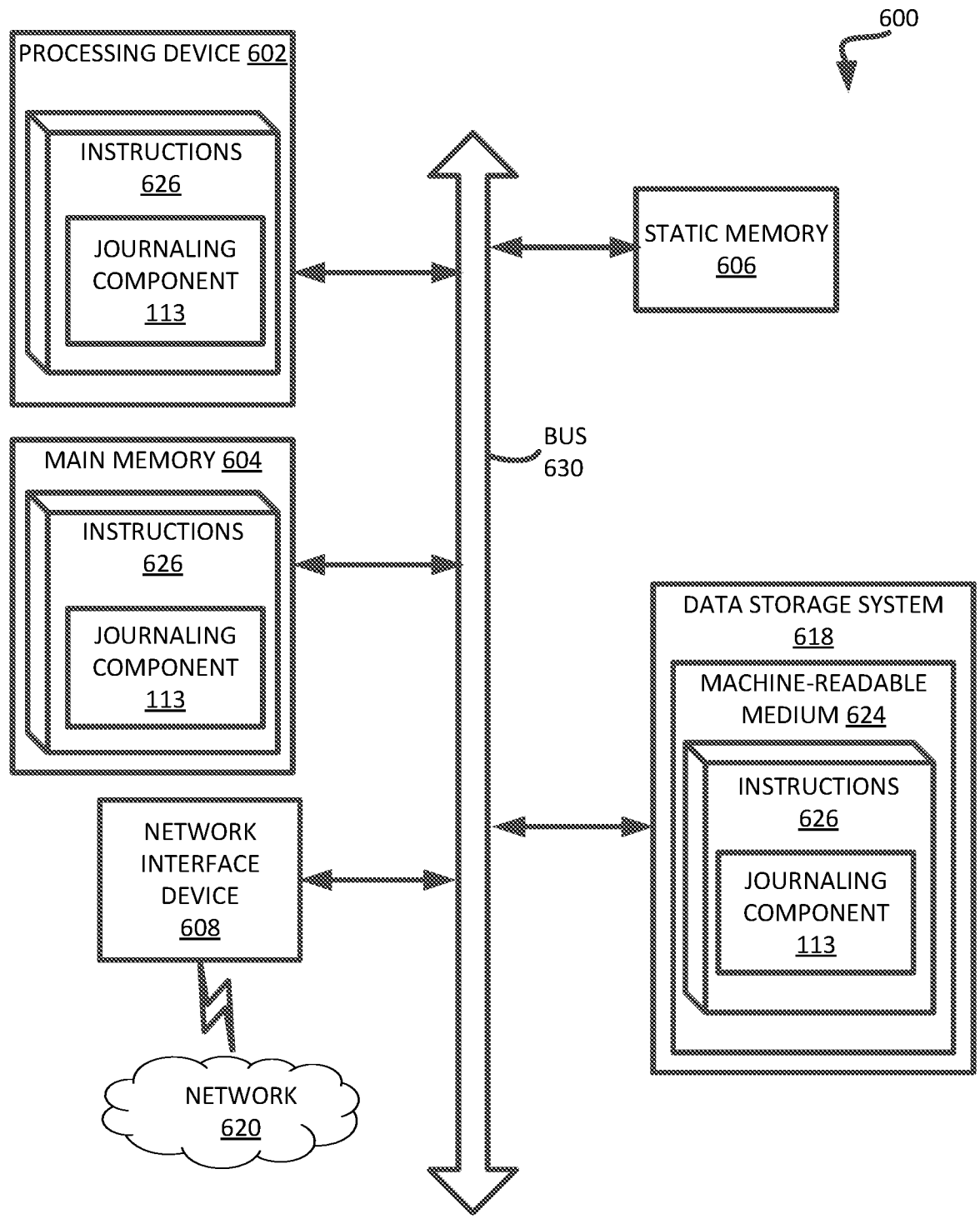
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the journaling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a journaling component (e.g., the journaling component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of memory devices comprising a volatile memory device and a non-volatile memory device; and
   a processing device, operatively coupled with the plurality of memory devices, to perform operations comprising:
   detecting an operation performed on the non-volatile memory device;
   determining a type of the operation, wherein the type of the operation comprises a type identifier and a type modifier;
   generating a journal entry reflecting the operation, wherein the journal entry comprises a body reflecting the operation and a header comprising the type identifier and the type modifier, wherein a combination of the type identifier and the type modifier defines a size of the journal entry; and
   writing, to the volatile memory device, the journal entry.

2. The system of claim 1, wherein the operation comprises an input/output operation received from a host or a media management operation.

3. The system of claim 1, wherein the body comprises at least one of: a logical address associated with the operation, an indication of a translation unit associated with the operation, a list of translation units associated with the operation, a region index, a page version, or command information associated with the operation.

4. The system of claim 1, wherein the processing device is to perform operations further comprising:
   responsive to an asynchronous power loss event, flushing the journal entry to the non-volatile memory device.

5. The system of claim 1, wherein the processing device is to perform operations further comprising:

detecting a second operation performed on the non-volatile memory device;
determining a second type of the second operation;
generating a second journal entry reflecting the second operation;
determining a location in a journal based on the size of the journal entry; and
writing, to the volatile memory device, the second journal entry in the journal at the determined location.

6. The system of claim 1, wherein the processing device is to perform operations further comprising:
responsive to a power on event following an asynchronous power loss, identifying one or more journal entries;
identifying a first journal entry of the one or more journal entries, wherein the first journal entry comprises a header and a body;
determining, based on the header, a size of the first journal entry; and
determining a location of a second journal entry based on the size of the first journal entry.

7. The system of claim 5, wherein the processing device is to perform operations further comprising:
updating a logical to physical (L2P) data structure based on the body of the one or more journal entries.

8. A method comprising:
detecting a modification to a logical to physical (L2P) data structure;
determining an operation type associated with the modification, wherein the operation type comprises a type identifier and a type modifier;
generating a journal entry reflecting the operation, wherein the journal entry comprises a body reflecting the operation and a header comprising the type identifier and the type modifier, wherein a combination of the type identifier and the type modifier defines a size of the journal entry; and
writing, to a volatile memory device, the journal entry.

9. The method of claim 8, wherein the operation type is at least one of a sequential host write, a non-sequential host write, an aborted host write, a folding write, a region deallocation, a region range deallocation, a page version update, an end-of-journal tag, or an uncorrectable error event.

10. The method of claim 8, wherein the body comprises at least one of: a logical address associated with the modification, an indication of a translation unit associated with the modification, a list of translation units associated with the modification, a region index, a page version, or command information associated with the modification.

11. The method of claim 8, further comprising:
detecting a second modification to the L2P data structure;
determining a second operation type associated with the second modification;
generating a second journal entry reflecting the second modification;
determining a location in a journal based on the size of the journal entry; and
writing, to the volatile memory device, the second journal entry in the journal at the determined location.

12. The method of claim 8, further comprising:
responsive to a power on event following an asynchronous power loss, identifying one or more journal entries;
identifying a first journal entry of the one or more journal entries, wherein the first journal entry comprises a header and a body;
determining, based on the header, a size of the first journal entry; and
determining a location of a second journal entry based on the size of the first journal entry.

13. The method of claim 12, further comprising:
updating the L2P data structure based on the body of the one or more journal entries.

14. A non-transitory computer-readable storage medium comprising instructions that, when executed by a processing device, cause the processing device to perform operations comprising:
detecting an operation performed on a non-volatile memory device;
determining a type of the operation, wherein the type of the operation comprises a type identifier and a type modifier;
generating a journal entry reflecting the operation, wherein the journal entry comprises a body reflecting the operation and a header comprising the type identifier and the type modifier, wherein a combination of the type identifier and the type modifier defines a size of the journal entry; and
writing, to a volatile memory device, the journal entry.

15. The non-transitory computer-readable storage medium of claim 14, wherein the operation comprises an input/output operation received form a host or a media management operation.

16. The non-transitory computer-readable storage medium of claim 14, wherein the body comprises at least one of: a logical address associated with the operation, an indication of a translation unit associated with the operation, a list of translation units associated with the operation, a region index, a page version, or command information associated with the operation.

17. The non-transitory computer-readable storage medium of claim 14, wherein the processing device is to perform operations further comprising:
responsive to an asynchronous power loss event, flushing the journal entry to the non-volatile memory device.

18. The non-transitory computer-readable storage medium of claim 14, wherein the processing device is to perform operations further comprising:
detecting a second operation performed on the non-volatile memory device;
determining a second type of the second operation;
generating a second journal entry reflecting the second operation;
determining a location in a journal based on the size of the journal entry; and
writing, to the volatile memory device, the second journal entry in the journal at the determined location.

19. The non-transitory computer-readable storage medium of claim 14, wherein the processing device is to perform operations further comprising:
responsive to a power on event following an asynchronous power loss, identifying one or more journal entries;
identifying a first journal entry of the one or more journal entries, wherein the first journal entry comprises a header and a body;
determining, based on the header, a size of the first journal entry; and
determining a location of a second journal entry based on the size of the first journal entry.

20. The non-transitory computer-readable storage medium of claim 19, wherein the processing device is to perform operations further comprising:

updating a logical to physical (L2P) data structure based on the body of the one or more journal entries.

* * * * *